United States Patent

[11] 3,582,545

[72] Inventor Laurence Joseph Thorpe
Marlton, N.J.
[21] Appl. No. 809,178
[22] Filed Mar. 21, 1969
[45] Patented June 1, 1971
[73] Assignee RCA Corporation

[54] AUTOMATIC BLACK LEVEL VIDEO SIGNAL CLIPPING AND CLAMPING SYSTEM

11 Claims, 2 Drawing Figs.

[52] U.S. Cl. .......... 178/7.2
[51] Int. Cl. .......... H04n 5/16
[50] Field of Search .......... 178/7.1 DC, 7.3 DC, 7.5 DC

[56] References Cited

UNITED STATES PATENTS

| | | | |
|---|---|---|---|
| 2,572,179 | 10/1951 | Moore | 178/7.3DC |
| 2,850,627 | 9/1958 | Moore et al. | 178/7.1DC |
| 3,207,998 | 9/1965 | Corney et al. | 178/7.3DC |
| 3,315,033 | 4/1967 | Sennhenn et al. | 178/7.1DC |

*Primary Examiner*—Robert L. Griffin
*Assistant Examiner*—John C. Martin
*Attorneys*—William H. Meagher and Eugene M. Whitacre

ABSTRACT: A transistor amplifier converts a video signal voltage at its input circuit into a corresponding video signal current at its output circuit which is applied to the input of a black level clipper transistor. A high impedance constant reference current source is coupled to both the input of the clipper transistor and to the output circuit of the amplifier. The clipper transistor linearly transfers the video signal at its input to its output circuit until the input video signal current equals the constant current, whereupon the clipper transistor is cut off preventing further video signal current conduction in its output circuit. The excess of the video signal current beyond the reference clipping level is detected by a sensor transistor, the output current from which is sampled by a transistor pulsed during the synchronizing interval. The current samples are integrated and, after direct current amplification, are converted to a corresponding voltage which is applied as a feedback clamping control signal to clamp the video signal voltage at a reference black level.

INVENTOR
Laurence J. Thorpe

BY [signature]
ATTORNEY

*INVENTOR*
Laurence J. Thorpe

BY [signature]

*ATTORNEY*

AUTOMATIC BLACK LEVEL VIDEO SIGNAL CLIPPING AND CLAMPING SYSTEM

BACKGROUND OF THE INVENTION

The image representative video signals derived from a pickup device such as a television camera tube in both black and white and color television systems require certain processing in order to prepare them for transmission to one or more receiving and image-reproducing devices. Such processing includes, not only the performance of such functions as suitable signal amplification, aperture correction, gain control and gamma correction to compensate for the nonlinear transfer characteristic of the reproducing device, but also comprises the clipping of the video signal at a predetermined black level and the clamping of the signal at such level. In the prior art as exemplified by U.S. Pat. No. 3,368,033 granted Feb. 6, 1968 to R. A. Dischert and N. P. Kellaway, the video signal is first clamped at a predetermined black level and then is clipped essentially at a reference potential by means operating independently of the clamping means before its application to the gamma correction apparatus. It, therefore, is seen that the video signal may be clamped at one potential and clipped at a different potential. It is essential that the blanking portion of the video signal applied to the gamma correction apparatus be clamped at a predetermined black level and it is desirable that the clipping of the image-representative portion of that signal be effected at essentially the same black level at which clamping occurs.

It, therefore, is an object of this invention to provide a system in which black level video signal clipping and clamping automatically are effected at substantially the same signal level representative potentials.

In accordance with the invention, the black level clipper is included in the system following the clamping means, as in prior art systems such as represented by the Dischert et al. patent, but the present system provides feedback means between the clipper and the clamping means, the feedback means being responsive to the black level at which the signal is clipped to produce a suitable control signal which is applied to the clamping means so that it operates to automatically clamp the signal at a potential representing substantially the same signal level at which it is clipped.

Figure 1:
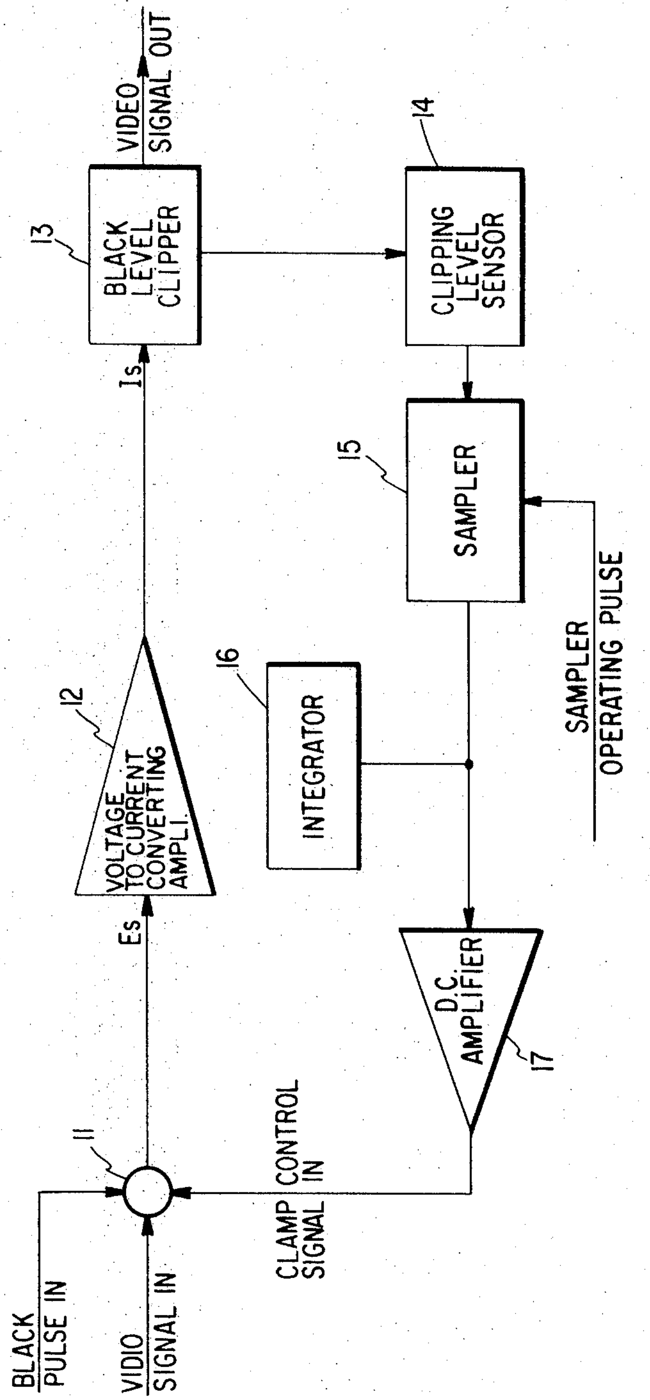
Figure 2:
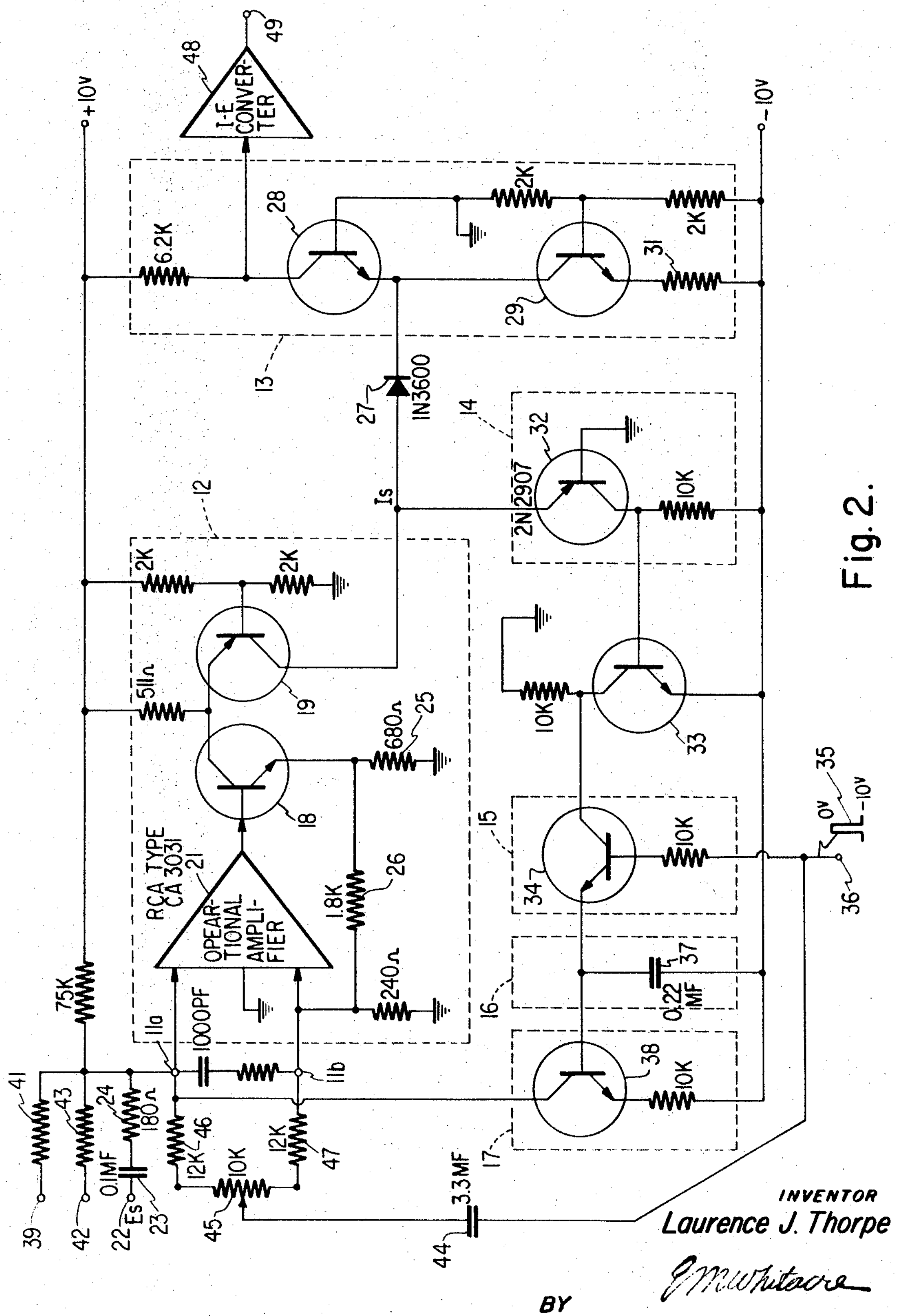

For a more specific disclosure of the invention, reference may be had to the following detailed description of an illustrative embodiment which is given in conjunction with the accompanying drawings, of which:

FIG. 1 is a functional block diagram of the automatic black level video signal-clipping system of the invention; and FIG. 2 is a schematic circuit diagram showing the details of the system of FIG. 1.

In FIG. 1 the terminal 11 represents the input point at which the video signal $E_s$ and other control signals, such as black pulse and the feedback-clamping control signal, are applied to the system. These signals are in the form of voltages which are applied to an amplifier 12 which, not only amplifies the video signal $E_s$, but also converts it into a corresponding video signal current $I_s$ which is impressed upon a black clipper 13, the output of which is reconverted into a video signal voltage and applied to additional processing circuits such as a gamma correction circuit (not shown).

The current level at which the video signal $I_s$ is clipped by the clipper 13 is detected by a clipping level sensor 14 which transfers any excess of the video signal $I_s$ cut off by the clipper 13 to a sampler 15. The sampler is an electronic switch which is operated periodically during horizontal line blanking intervals under the control of a sampler operating pulse so as to produce in the sampler output a series of pulses representative of the difference between black level of the video signal $I_s$ during horizontal blanking or synchronizing interval and the reference level of the clipper 13. The output pulses from the sampler 15 are converted by an integrator 16 into a continuous unidirectional current which is amplified by a DC amplifier 17 to produce a control signal representative of the excess of the video signal $I_s$ beyond the clipping level and which is applied to the input terminal 11 of the system to clamp the input video signal $E_s$ substantially at a level corresponding to the clipping level of clipper 13.

In FIG. 2 the details of the block diagram of FIG. 1 are shown with the essential components of each shown enclosed within broken line rectangles identified by the same reference characters as used in FIG. 1. The amplifier 12 for converting the video signal voltage $E_s$ into a corresponding video signal current $I_s$, in addition to having transistors 18 and 19, also includes an operational amplifier 21 which may be an RCA type CA3031 integrated circuit device. The amplifier 21 is provided with a differential input which includes terminals 11*a* and 11*b*. A video signal voltage $E_s$ which may have a peak-to-peak value of approximately 200 millivolts at terminal 22 is coupled by a series connected capacitor 23 and resistor 24 to the input terminal 11*a* of the amplifier 21 with white image representative portions being positive in relation to black image representative signal portions. The video signal derived from the output of the operational amplifier 21 is impressed upon the base electrode of the transistor 18 which is operated in the common emitter electrode mode with a fairly high emitter connected resistor 25. A negative feedback from the emitter electrode of transistor 18 through a feedback resistor 26 to the inverting input terminal 11*b* of the amplifier 21 is such as to force the output from the collector electrode of the transistor 18 to be a video signal current which is directly proportional to the video signal voltage impressed upon the input terminal 11*a* of the operational amplifier 21. The loop gain of the arrangement including the operational amplifier 21 and the transistor 18, in one successfully operated embodiment of the invention as disclosed in FIG. 2, is approximately 40 decibels which is adequate to provide excellent stability and frequency response of the video signal current developed at the collector electrode of the transistor 18.

The transistors 18 and 19 of the converting amplifier 12 are connected as shown to form a video signal amplifier configuration which insures that the video signal current $I_s$ developed at the collector electrode of the transistor 19 also is directly proportional to the video signal voltage $E_s$ impressed upon the video signal input terminal 22. In the illustrative embodiment of FIG. 2 the video signal current $I_s$ has a peak-to-peak value of about 6 milliamperes with white image representative signal portions being negative (or less positive) in relation to black image-representative signal portions.

Before the signal-clipping clipping level is reached, in a manner to be described presently, the video signal current $I_s$ is coupled from the collector electrode of the transistor 19 through a diode 27 to the junction of an input emitter electrode of a black level clipper transistor 28 and the collector electrode of a constant reference current supply transistor 29. Black level clipper transistor 28 is connected for grounded base electrode operation and produces a clipped video signal current at its output collector electrode. The constant current transistor 29 operated with negative feedback in its emitter circuit which includes a resistor 31.

As long as the video signal current $I_s$ is less than the reference collector current supplied by transistor 29 (which is the case for normal operation in response to white or gray image-representative signals up to nominal black level signals), the clipper transistor conducts. Because of the described relationship of black and white representative signal portions of the video signal current $I_s$ (i.e. black level current maximum and white level current minimum), and the fact that until clipping level is reached the current in transistor 28 equals the difference between the reference current supplied by transistor 29 and the video signal current $I_s$, the output current in clipper transistor 28 is minimum for black level and maximum for white level signals. Thus, as the video signal current $I_s$ increases representing a change from white to gray to black image light and approaches the value of the constant current from the transistor 29, the conductivity of the clipper transistor 28 decreases correspondingly in a very linear manner. When the video signal current $I_s$, representing the desired black level derived from the output voltage-to-current converting amplifier output transistor 19, is reached and equals the constant current from the transistor 29, the clipper transistor 28 is forced to become nonconducting so that no more of the video signal current $I_s$ is transferred to its output collector electrode, thereby effectively clipping the video signal.

Any further positive increase of the video signal current $I_s$ which is in excess of the constant current supplied by the transistor 29 is applied to the emitter electrode of a grounded base electrode-clipping level sensor transistor 32. Transistors 32, up to the point of the establishment of equality of the video signal current and the constant reference current from transistor 29, has been cut off, thus presenting a high impedance to the collector electrode of the voltage-to-current converting amplifier output transistor 19. The excess of the video signal current $I_s$ over the constant current from the transistor 29 produces a clipping level indicating signal at the collector electrode of the transistor 32 of the clipping level sensor 14 which, after amplification by an amplifier transistor 33, is applied to the collector electrode of a transistor 34 comprising the sampler 15. The sampler transistor 34 is normally nonconducting until rendered momentarily conducting by a positive-going pulse 35 which is impressed upon a terminal 36 during horizontal line blanking intervals and is applied to its base electrode. The video signal current $I_s$ is therefore compared to the reference current level during horizontal blanking interval (where the current should nominally represent black level video) and any excess is sensed.

Current pulses produced at the emitter electrode of the sampler transistor 34 are applied to the integrator 16 which includes a storage capacitor 37 by which the pulses are converted into a continuous unidirectional voltage representative of the black level error. This unidirectional voltage is impressed upon the input base electrode of a common emitter electrode operated transistor 38 of the DC amplifier 17 to produce at its output collector electrode a control signal voltage. This control signal voltage is applied to the video signal input terminal 11a where it is added to the video signal so as to clamp the blanking interval of the video signal at a level corresponding to the black clipping level. Thus, by means of the feedback clamping facility of this invention including the clipping level sensor 14, the sampler 15, the integrator 16 and the DC amplifier 17 coupled between the black level clipper 13 and the video signal input terminal 11a it is assured that clipping always occurs at a level corresponding to the predetermined black level. In other words, there is established, by means of the invention, a control loop which is self adjusting so that the desired video signal produced by the system has a range which extends to just inside of the clipping level, i.e., the control loop is stable only when clipping of the video signal current $I_s$ occurs. If the video signal applied to the input terminal 11a has any tendency for the black level thereof to shift, such tendency is immediately counteracted by this loop which is designed to have appreciable gain.

The automatic black level video signal-clipping system of this invention is capable of operating in a signal processing arrangement wherein the black level of the video signal is susceptible of being altered by means of so-called "black pulses" which occur during horizontal line blanking intervals and are added to the video signal before it is clamped and clipped, as generally disclosed in the Dischert et al. patent. Where the present invention is part of each of three signal-processing amplifiers used in a color television system it is necessary to provide a simultaneous "master black" level control of all three of the color television signals. This is accomplished by impressing a small pulse which is variable in both amplitude and polarity upon a terminal 39 from which it is transferred through a resistor 41 to the video signal input terminal 11a where it is added to the video signal during horizontal blanking interval. In addition, it is necessary to provide a separate "paint black" level control for each of the color signals which is achieved by impressing a similar small pulse of variable amplitude and polarity upon a terminal 42 from which it is transferred through a resistor 43 for addition to the video signal at the input terminal 11a. The amplitude and polarity of both such pulses are controlled from a remote point.

The apparatus of the present system also includes a "local black" level control by which to adjust it for proper operation in the manner described. This is accomplished by adding differentially some of the clamping pulse 35 to the operational amplifier 21. The pulse 35 is coupled by a capacitor 44 to the adjustable contact of a potentiometer 45 which is coupled by resistors 46 and 47 to the input terminals 11a and 11b of the amplifier 21. Depending upon the adjustment of the potentiometer 45 the video signal impressed upon the amplifier 21 will be shifted either positively or negatively.

In the circuit arrangement of FIG. 2, while all of the transistors are shown as individual devices which is considered to be within the purview of the invention, a successfully operated form of such a circuit included only the PNP transistors 19 and 32 as separate units of the type indicated. The NPN transistors 18, 33, 34 and 38 were included in an RCA type CA3018A integrated circuit and the NPN transistors 28 and 29 were included in a similar integrated circuit.

By means of the disclosed circuit arrangement and its described mode of operation the video signal current derived from the output collector electrode of the clipper transistor 28 is transformed into a corresponding video signal voltage of about a 6-volt peak-to-peak value by a current-to-voltage converter amplifier 48 from which it is delivered to an output terminal 49. The video signal voltage at the output terminal 49 is one which is clipped at a desired black level at which it is also clamped and, thus, is suitable for application to additional processing circuits such as a gamma correction circuit (not shown).

I claim:

1. An automatic black level video signal clipping system, comprising:
   a source of a video signal-representing light values of a subject varying from black to white;
   a black level clipper for transferring to its output circuit those portions of a video signal impressed upon its input circuit which represent light values above a predetermined black level and for clipping said video signal by preventing those video signal portions at and below said predetermined black level from being transferred to its output circuit;
   coupling means for impressing said video signal derived from said source upon the input circuit of said black level clipper;
   detecting means coupled to the junction of said coupling means and said clipper for producing a difference signal corresponding to the difference between the video signal level and the clipping level; and
   feedback-clamping means coupled between said detecting means and said video signal source and responsive to said difference signal, for applying a control signal to said video signal source to automatically clamp said video signal at substantially said predetermined black level.

2. An automatic black level video signal-clipping system as defined in claim 1, wherein:
   said video signal source produces a video signal voltage; and
   said coupling means includes a signal conversion amplifier to convert said video signal voltage into a corresponding video signal current.

3. An automatic black level video signal clipping system as defined in claim 2, wherein:
   said black level clipper includes a source of substantially constant unidirectional current connected to its input circuit and means for combining said constant current with current representative of said video signal for establishing the video signal transfer capability of said clipper.

4. An automatic black level video signal clipping system as defined in claim 3, wherein:

said feedback-clamping means includes a sampler coupled to said sensing means for response to said indicating signal;

means for operating said sampler during horizontal line blanking intervals to produce a series of pulses corresponding to the amplitude of said indicating signal; and conversion means coupled to said sampler and responsive to said series of pulses to produce a continuous unidirectional control signal for application to said video signal source.

5. An automatic black level video signal clipping system as defined in claim 4, wherein:

said conversion means includes an integrating circuit coupled to said sampler and responsive to said series of pulses to produce a continuous unidirectional voltage; and unidirectional signal-amplifying means coupled to said integrating circuit and responsive to said continuous unidirectional voltage for producing said control signal and applying it to said video signal source.

6. An automatic black level video signal-clipping clipping system as defined in claim 5, wherein:

said black level clipper comprises a grounded base singal-amplifying transistor having an input circuit including its emitter electrode and an output circuit including its collector electrode.

7. An automatic black level video signal clipping system as defined in claim 6, wherein:

said substantially constant unidirectional current source comprises a transistor having its collector electrode connected to the emitter electrode of said black level clipper transistor, its emitter electrode connected to a source of electrical energy, and its base electrode coupled to said source of electrical energy.

8. An automatic black level video signal-clipping system as defined in claim 7, wherein:

said signal conversion amplifier comprises an operational amplifier having input and output terminals and a pair of input and output transistors of opposite conductivity;

said input transistor having its base electrode coupled to said operational amplifier output terminal and being operated in a common emitter electrode mode with its collector electrode connected to the emitter electrode of said output transistor, and said output transistor being operated in a grounded base electrode mode;

means for impressing said video signal derived from said source of video signal upon the input terminal of said operational amplifier; and means including a diode coupled between the collector electrode of said conversion amplifier output transistor and the common connection of the emitter electrode of said black level clipper transistor and the collector electrode of said constant current transistor, said diode being poled to conduct current in the direction of said common connection.

9. An automatic black level video signal-clipping system as defined in claim 9, wherein:

said detecting means comprises a grounded base transistor having its emitter electrode connected to the collector electrode of said signal conversion amplifier output transistor and its collector electrode coupled to said sampler;

said sampler including a transistor having its collector-to-emitter electrode circuit coupled between said sensing transistor collector electrode and said integrating circuit; and means for applying an operating pulse during each horizontal line blanking interval to the base electrode of said sampler transistor to produce said series of pulses corresponding to the amplitude of said indicating signal.

10. An automatic black level video signal-clipping system as defined in claim 9, wherein:

said unidirectional signal-amplifying means comprises a transistor operated in a common emitter mode having its base electrode coupled to said integrating circuit and its collector electrode coupled to the input of said video signal source.

11. An automatic black level video signal-clipping system as defined in claim 10, wherein:

said input transistor of said signal conversion amplifier, said black level clipper transistor, said substantially constant undirectional current transistor, said sampler transistor, and said unidirectional signal-amplifying means transistor are NPN devices; and said output transistor of said signal conversion amplifier and said sensing means transistor are PNP devices.